INVENTORS
JOHN F. DURYEE
RAYMOND G. LINS

BY Thomas J. Nikolai
ATTORNEY 3,303,748
MOTIVE DRIVE SYSTEM
John F. Duryee, Bloomington, and Raymond G. Lins, Minneapolis, Minn., assignors to Sperry Rand Corporation, New York, N.Y., a corporation of Delaware
Filed Mar. 27, 1964, Ser. No. 355,181
8 Claims. (Cl. 91—57)

The present invention relates to a drive system operated by fluid pressure simultaneously supplied to the intake ports of a number of flexible tubes. Planetary rollers located on a spider are employed such that they apply physical pressure to, and partially collapse, a portion of the tubes; this serves to effect a pressure differential within the tubes, creating a resultant force used to drive the rollers.

Power sources of the type indicated above have many uses, among which is their employment in vacuum systems for the purpose of introducing mechanical motion into a vacuum chamber without encountering sealing difficulties previously associated with this field of endeavor.

An application of the above mentioned power source is in the field of vacuum deposition wherein magnetic material is formed by condensing evaporated magnetic material in the presence of a magnetic field. Patent 2,900,282 to Rubens demonstrates exemplary apparatus utilized in the deposition process.

In the present stage of vacuum technology, power sources are generally located external to a vacuum system and are used to generate motion, which in turn is transferred by power transmitters through a vacuum barrier and into the vacuum chamber. This motion is translated (within the chamber) into mechanical movements capable of opening or closing flow values, feeding wires, breading a glass seal-off, and many other well defined, precise functions. However, the means for introducing mechanical motion into the vacuum chamber requires the use of seals. Its use is limited in that the gaskets or seals surrounding the translating linkage (rotating shaft) tend to leak atmosphere into the chamber. In the above mentioned patent, the mechanical effort required to produce mechanical motion within the vacuum system requires an external source of power whereby mechanical power is transmitted through various rods and linkages extending through a seal to the internal portion of the vacuum chamber. It is virtually impossible to obtain a gasket that can deform itself into the imperceptible flaws in the surfaces in motion so as to realize an impermeable barrier between the outside atmosphere and the vacuum chamber. Also there is evidence that gasket material is actually sublimed into the vacuum system as lower and lower pressures are attained, resulting in contamination of the vacuum chamber. Replacement of the seal periodically is then also required.

The above-mentioned limitations associated with an external power source indicate the desirability of locating said power source within the vacuum system. However, this was impracticable prior to this invention, due to many factors such as the prohibitive size of most motors, if electric—the undesirable stray magnetic fields being generated and the possibility of contaminants (impurities) from the power source being deposited on substrate during the deposition process. An electric motor also produces undesirable sparking. To eliminate or reduce these limitations, the present invention provides a practical design for a sealless air motor whose compactness, simplicity, and reliability permit it to be employed as a power source suitable for application within a vacuum deposition system.

It is therefore one of the primary objects of the invention to provide a fluid operated drive system sealed in a vacuum chamber.

It is an additional primary object of this invention to provide a motor drive device sealed in a vacuum chamber whereby mechanical motion is introduced into the vacuum chamber without encountering sealing difficulties.

These and other more detailed and specific objects will be disclosed in the course of the following specification:

Figure 1:
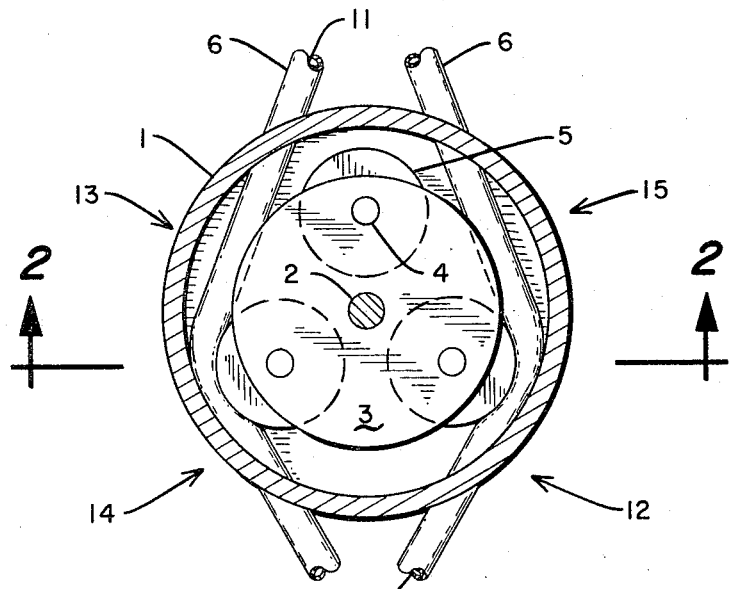
FIG. 1 is a sectional end view of the motor drive device.
Figure 2:
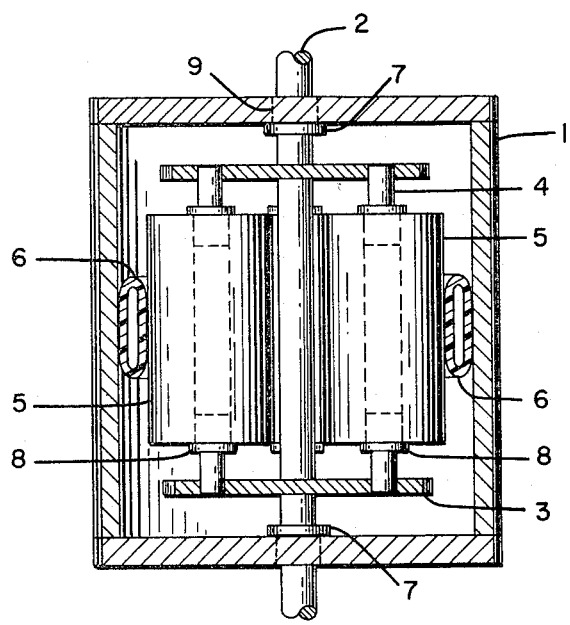
FIG. 2 is a horizontal sectional view taken on line 2—2 of FIG. 1.

Referring in detail to the drawings and more particularly to FIG. 1, the invention includes a cylindrical housing assembly 1 supporting a drive shaft 2 fixed to a spider member 3. A cylindrical housing is not required; a square configuration would also be suitable. However, the cylindrical design permits a better bearing surface for the tubing 6. Referring to FIG. 2, there are supported on roller shafts 4, between the ends of the spider member 3, three planetary rollers 5 disposed at 120° intervals along the spider member. As seen in FIGS. 1 and 2, a number of flexible highly resilient tubes 6 with their respective intake and exhaust ports pass through the motor housing 1.

The drive shaft, spider, and roller shaft are joined as shown in FIG. 2 to form a single unit. Shoulders 7 protruding from the drive shaft serve to locate and positively align this unit within the motor housing assembly. The planetary rollers 5 ride on bushings 8 fixed to the spider roller shafts 4, while the drive shaft 2, passing externally to the assembly, rotates on Oilite bearings 9 inserted in the motor body.

The following description of motor operation is made with specific reference to FIG. 1. Air pressure (15–90 p.s.i.) is simultaneously supplied to the intake ports 10 and 11 of both flexible tubes. Since the tube passages are partially blocked by two of the planetary rollers the pressure in sections 12 and 13 will be greater than that in sections 14 and 15. This pressure differential applies a radial force component to the obstructing planetary roller. This radial force can be resolved into forces radial and tangential to the spider. This drives the roller (rotating in a clockwise direction) toward its respective exhaust port. The spider, containing the roller shafts about which the planetary rollers revolve, will in turn be driven (rotating in a counterclockwise direction), and the drive shaft being fixed to said spider will transmit this motion for subsequent translation into precise, well defined mechanical movements.

Figure 3:
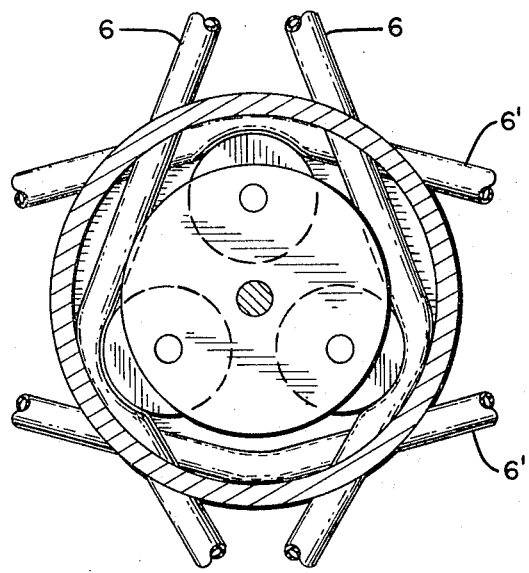
FIG. 3 is a sectional end view of a modification of the embodiment of FIG. 1 utilizing a plurality of tubes.

The speed of the motor can be varied by regulating the supplied pressure. An increase in pressure simultaneously applied to the intake ports will effect a proportionally greater pressure differential, which in turn exerts a greater force component on the obstructing planetary rollers, driving them harder, and increasing the r.p.m. of the associated spider and attached drive shaft. Conversely, decreasing the pressure supplied to the intake ports serves to decrease the pressure differential; hence the rollers are driven with less force and the spider and attached drive shaft rotate at a slower r.p.m. The direction of rotation of the motor can be reversed simply by applying reverse pressure to the tubing. Referring to FIG. 3, in this embodiment it is contemplated using more tubes 6′ to realize a smoother running, more powerful motor.

Although the motor illustrated in FIG. 3 shows four tubes, it is not limited to that particular number. The device is also capable of functioning simultaneously as a pump. Two of the four tubes may be used for pumping fluid and the other two may operate as part of the motor system. It can be seen that this is an important factor wherever a power source is required to produce mechanical motion and where at the same time a pumping action is needed without the necessity of utilizing an extra pump or motor in a system where space requirements are critical.

The use of a minimum of three planetary rollers is an important feature since any number less than three would prevent starting of the motor when the planetary rollers are located in a critical position. By locating them at 120°, it can always be assumed that at least one roller will be in working contact with a tube. With three rollers, any number of tubes may be utilized; however, the motor attains smoother operation with an increasing number of tubes up to the physical limitations of the housing itself.

A unique characteristic of the motor in FIGS. 1–3 lies in the fact that it attains high speed operation very quickly. This is an important characteristic where the desired mechanical motion must be expected over a short period of time. Another important advantage is that the entire device may be produced at a very low cost from plastic.

Figure 4:
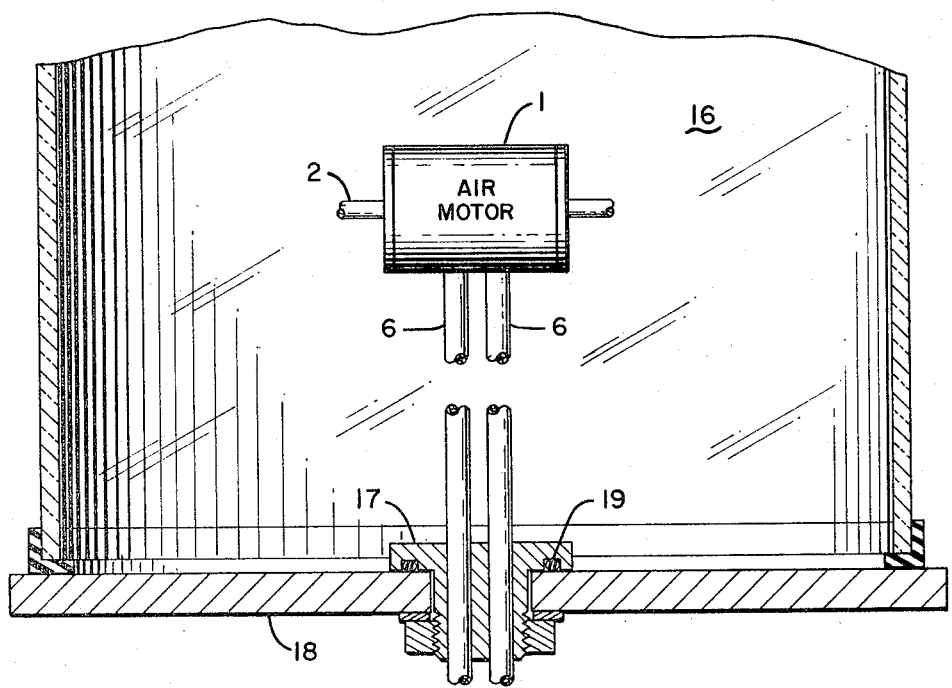
FIG. 4 is a top plan view of a system incorporating the motor drive device in a vacuum chamber.

Referring now to FIG. 4, there is illustrated an application of the invention whereby the motor drive is sealed in a vacuum chamber 16 and wherein the intake and exhaust tubes pass through a feed-through sleeve 17 in vacuum barrier wall 18 into the vacuum chamber. The use of gaskets or seals 19 is not detrimental in realizing a high vacuum system since no movement is required in transmitting the fluid medium to the motor source. This absence of movent permits the tubes to be held fast and greatly reduces the leakage of atmosphere into the vacuum. Although not illustrated, it is conceivable that more than one motor could be powered by a single pair of intake and exhaust tubes by branching the tubes using T-joints or splices, for example.

Figure 5:
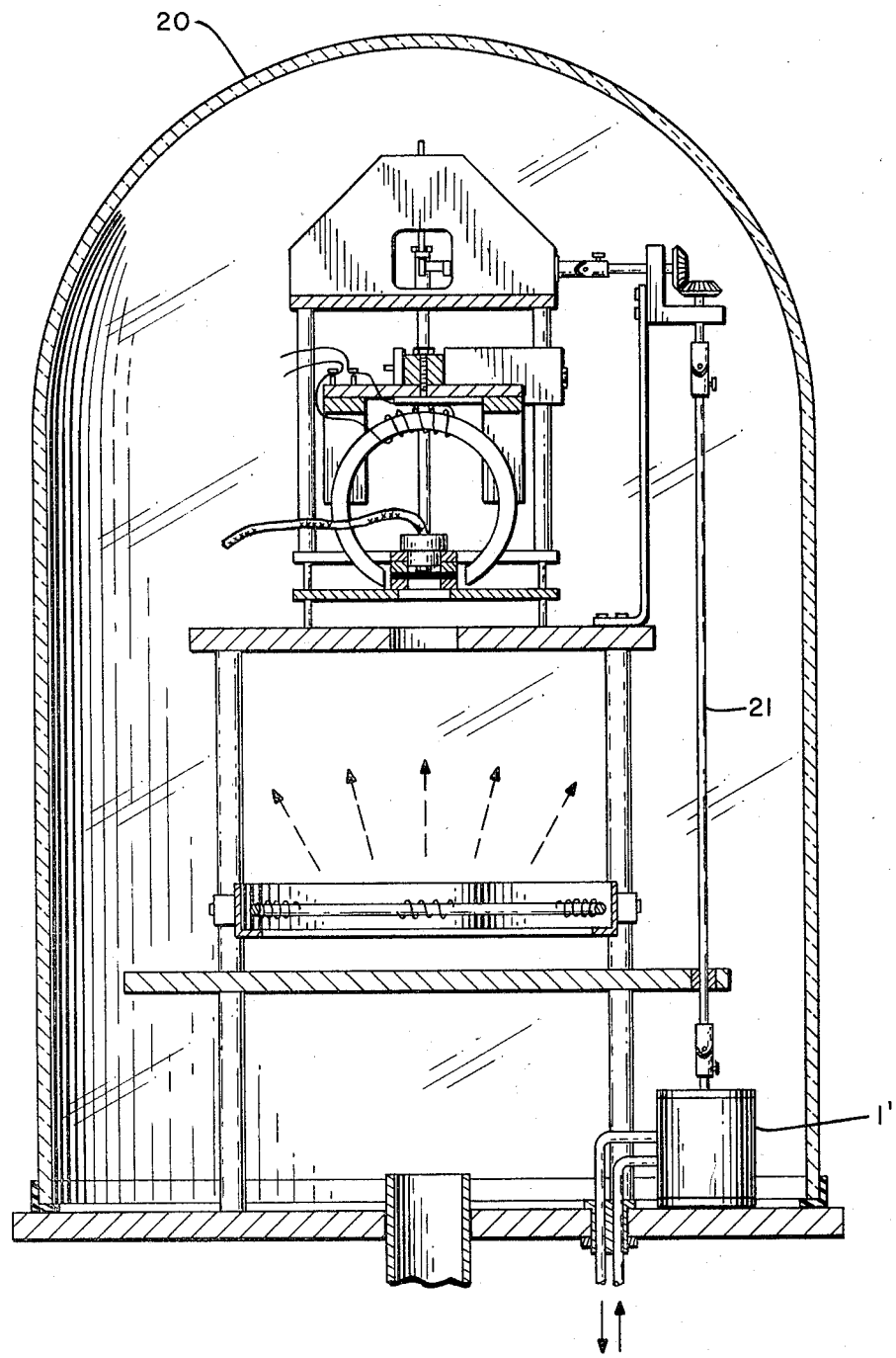
FIG. 5 is a schematic illustration of the evacuable environment in which the motor drive may be utilized.

FIG. 5 illustrates utility of the invention in a vacuum deposition system wherein the motor 1′ is located internally of the vacuum container 20 and is connected to drive shaft 21. Since it is not intended that the structure within the vacuum chamber is to be a part of this application, no further explanation of the vacuum deposition apparatus is considered necessary. It can be seen, however, that incorporation of the motor within the chamber eliminates the extension of the drive shaft 21 externally of the chamber 20 and thus eliminates the sealing problems previously encountered with transmission of mechanical motion. The figure demonstrates just one application of the motor. But it is evident that there can be innumerable uses for the invention such as for example in high speed dental equipment, transmitting mechanical motion within areas of nuclear radiation, as well as using the device as a pump whenever the need arises for such a compact, reliable, and inexpensive unit.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

1. A drive system mounted in an evacuated chamber for producing mechanical motion therein comprising in combination: a vacuum chamber mounting at one end as a portion thereof a vaccuum barrier, a cylindrical housing mounted within said chamber and disposed about an axis, a drive shaft on said axis and supported by said housing, a spider wheel fixed to said shaft, a plurality of rollers mounted around the periphery of said wheel, continuous flexible tubing arranged on the radially inner surface of said housing and intermediate said roller and said inner housing surface, the radially outermost portion of said rollers being spaced from said housing surface, but at a lesser distance therefrom than the undeformed diameter of said tubing, the tubing extending through and being sealed with respect to said barrier, where it traverses said barrier, said tubing transporting a pressurized fluid medium whereby said rollers partially restrict a portion of the tubing causing a pressure differential across said restriction resulting in a force component acting to drive said rollers and said spider wheel in opposite relative directions to exert a driving force on said drive shaft.

2. The invention defined in claim 1, wherein the diameter of said spider member is less than the internal diameter of the housing but greater than the internal diameter of said housing minus the diameter of the tubing.

3. A drive system mounted in an evacuated chamber for producing mechanical motion therein comprising in combination: a vacuum chamber mounting at one end as a portion thereof a vacuum barrier, a cylindrical housing in said chamber and disposed about an axis, a drive shaft on said axis and supported by said housing, a spider wheel fixed to said shaft, a plurality of rollers mounted around the periphery of said wheel, said rollers being mounted on shafts supported by said wheel and axially fixed on said shafts with bushings, continuous flexible tubing arranged on the radially inner surface of said housing and intermediate said roller and said inner housing surface, the radially outermost portion of said rollers being spaced from said housing surface, but at a lesser distance therefrom than the undeformed diameter of said tubing, the tubing extending through and being sealed with respect to said barrier, where it traverses said barrier, said tubing transporting a pressurized fluid medium whereby said rollers partially restrict a portion of the tubing causing a pressure differential across said restriction resulting in a force component acting to drive said rollers and said spider wheel in opposite relative directions to exert a driving force on said drive shaft.

4. A drive system mounted within an evacuated chamber for producing mechanical motion therein comprising in combination: a vacuum chamber operatively mounting at one end as a portion thereof a vacuum barrier mounting a sleeve means sealed with respect to the barrier, continuous flexible tubing traversing said sleeve means and being sealed with respect to said sleeve means, where it traverses said sleeve means, a spider and roller assembly mounted within a cylindrical casing within the chamber, said tubing extending through said casing and extending intermediate said rollers and the internal periphery of said housing, said tubing having an undeformed diameter greater than the distance between the radially outermost periphery of said rollers and an internal surface of said casing, said tubing transporting a pressurized fluid medium whereby said rollers partially restrict a portion of the tubing causing a pressure differential across said restriction resulting in a force component acting to drive said rollers and said spider wheel in opposite relative directions to exert a driving force on said drive shaft.

5. The invention defined in claim 4 wherein said barrier is removable to permit access to the chamber.

6. A drive system mounted in an evacuated chamber for producing mechanical motion therein comprising in combination: a vacuum chamber having at one end as a removable portion thereof a vacuum barrier, said barrier mounting a sleeve means sealed with respect to said barrier, a spider wheel and roller assembly mounted on a shaft supported by a housing means secured to said chamber, continuous flexible tubing transporting a pressurized fluid medium and extending through said barrier, said housing, intermediate said rollers and said housing and out said sleeve means, said rollers partially restricting the passage of the fluid medium whereby a driving force is exerted on said shaft to produce rotation thereof.

7. The invention defined in claim 4 wherein said sleeve means is sealed with respect to said barrier by the use of a seal means disposed between said sleeve means and the barrier.

8. The invention defined in claim 6 wherein said sleeve means is sealed with respect to said barrier by the use of a seal means disposed between said sleeve means and the barrier.

References Cited by the Examiner

UNITED STATES PATENTS

| | | | |
|---|---|---|---|
| 271,257 | 1/1883 | Morton | 91—57 |
| 551,669 | 12/1895 | Fellows et al. | 91—57 |
| 2,160,981 | 6/1939 | O'Brien | 118—49 |
| 2,410,720 | 11/1946 | Dimmick | 118—49 |
| 2,414,406 | 1/1947 | Colbert et al. | 118—49 |
| 2,767,682 | 10/1956 | Smith | 118—49 |
| 2,826,993 | 3/1958 | McChesney | 103—149 |
| 2,852,416 | 9/1958 | McNay et al. | 118—49 |
| 2,911,827 | 11/1959 | Hanks | 91—57 |
| 3,103,178 | 9/1963 | Thompson | 103—149 |

MARK NEWMAN, *Primary Examiner.*

JOSEPH H. BRANSON, Jr., *Examiner.*

F. T. SADLER, *Assistant Examiner.*